United States Patent Office 2,740,792
Patented Apr. 3, 1956

2,740,792

N-(BENZYLIDENE)-3-AMINO-2-OXAZOLIDONE AND METHOD FOR PREPARING THE SAME

Gordon D. Drake, Norwich, Gabriel Gever, Oxford, and Kenyon J. Hayes, Norwich, N. Y., assignors, by mesne assignments, to The Norwich Pharmacal Company, Norwich, N. Y., a corporation of New York No Drawing. Application August 13, 1953, Serial No. 374,146

7 Claims. (Cl. 260—307)

This invention relates to a new chemical compound and the preparation thereof. The new compound is N-(benzylidene)-3-amino-2-oxazolidone, described by the formula:

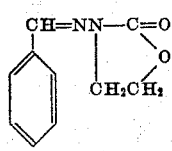

We have found that this new chemical compound can be prepared in good yield and in pure form by a novel procedure which entails a minimum of manipulative effort. This new compound is useful as an intermediate in the preparation of the valuable chemotherapeutic agent, N-(5-nitro-2-furfurylidene)-3-amino-2-oxazolidone, described and claimed in co-pending application Serial No. 274,066, filed February 28, 1952, wherein it is pointed out that N-(5-nitro-2-furfurylidene)-3-amino-2-oxazolidone is extraordinarily effective against pathogenic organisms such as *S. typhosa* and *V. comma*. The preparation thereof from our new compound is described in our co-pending application Serial No. 373,437, filed August 10, 1953. The reactions involved are depicted in our said co-pending application as follows:

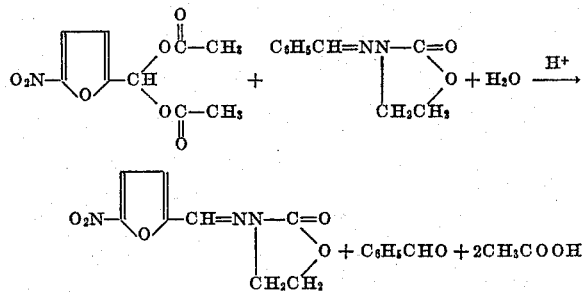

We have discovered that a benzaldehyde 2-hydroxyalkylhydrazone formed by the reaction of benzaldehyde with a mono-2-hydroxyalkylhydrazine will react with ethyl chlorocarbonate in alkaline aqueous alcoholic medium in the presence of a suitable buffering agent such as sodium acetate to form a N-(benzylidene)-3-amino-2-oxazolidone or derivative thereof. This product can be isolated and purified by recrystallization from a suitable solvent such as 95% ethanol. The reaction scheme described hereinabove may be represented by the following steps:

1.

C₆H₅CHO+H₂NNHCH₂CH₂OH ⟶ C₆H₅CH=NNHCH₂CH₂OH

2.

C₆H₅CH=NNHCH₂CH₂OH + ClCOOC₂H₅ ⟶

C₆H₅CH=NN—CH₂CH₂OH
   |
   C=O
   |
   OC₂H₅

3.

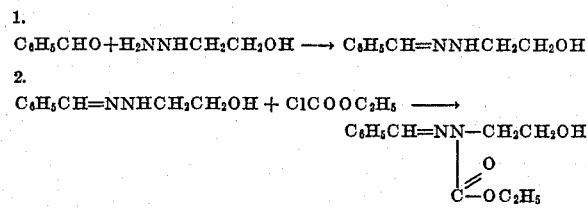

The reaction of step 1 proceeds smoothly. We have found that to insure the optimum performance of step 2, the addition of a buffering agent such as sodium acetate is desirable whereby the pH of the reaction medium is fixed at pH 6–7. The reaction of this step carried out under these conditions proceeds maximally. It has also been found that in the reaction of this step a molar ratio of ethyl chlorocarbonate to benzaldehyde 2-hydroxyethylhydrazone of about 1.3:1 at a temperature of about 19–21° C. produces maximum results.

We have found that the reaction of step 3 wherein the N-(benzylidene)-N'-(carbethoxy)-N'-(2-hydroxyethyl) hydrazone is treated in approximately 27% aqueous alcoholic media with a base such as sodium hydroxide to effect cyclization of this compound to the desired N-(benzylidene)-3-amino-2-oxazolidone in an amount of 97% of theory proceeds most effectively at a pH of about 9.8 using a molar ratio of sodium hydroxide to N-(benzylidene)-N'-(carbethoxy)-N'-(2-hydroxyethyl) hydrazone of about $1.5 \times 10^{-2}:1$ at about 30° C. Cyclization also can take place within the range of pH 7–9 but in lesser yield of the desired product.

In order that this invention may be fully available to those skilled in the art, the following illustrative example is given:

*Example*

To 10.0 grams (0.132 mol) of 2-hydroxyethylhydrazine in 48 cc. of water is added a solution of 14.8 grams (0.140 mol) of benzaldehyde in 40 cc. of 95% ethanol at 26–29° C. over a period of 31 minutes. After this addition, the reaction mixture is allowed to stand for four minutes and 41.7 grams of sodium acetate are then added in one portion. To this suspension is added dropwise 19.9 grams (0.184 mol) of ethyl chlorocarbonate at 20–22° C. with agitation over a period of about 80 minutes; the pH being approximately 6–7. The reaction mixture is stirred for 15 minutes. Then a solution of 7.4 grams of sodium hydroxide in 15 cc. of water is added at a temperature of approximately 32° C. (pH 9.8) and the reaction mixture is further stirred for one hour at 25–30° C. The crystals of N-(benzylidene)-3-amino-2-oxazolidone are filtered at about 13° C., rinsed with water, and dried. The crude yield is 22.6 grams or 90%; it is preferably recrystallized from 95% ethanol to give a purified yield of 21.2 grams of M. P. 143–145° C. (84.3% based on 2-hydroxyethylhydrazine).

What is claimed is:

1. N-(benzylidene)-3-amino-2-oxazolidone represented by the formula:

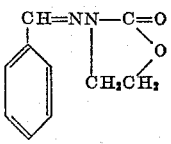

2. The method of preparing N-(benzylidene)-3-amino-2-oxazolidone, which comprises causing benzaldehyde 2-hydroxyethylhydrazone to react with ethyl chlorocarbonate to form N-(benzylidene)-N'-(carbethoxy)-N'-(2-hydroxyethyl) hydrazone and then effecting cyclization of said hydrazone in an aqueous alcoholic medium by adding a base thereto to bring the pH thereof within the range of 7 to about 9.8.

3. The method of preparing N-(benzylidene)-3-amino-2-oxazolidone, which comprises causing benzaldehyde 2-hydroxyethylhydrazone to react with ethyl chlorocarbonate to form N-(benzylidene)-N'-(carbethoxy)-N'-(2-hydroxyethyl) hydrazone in the presence of a buffering agent adapted to maintain a pH within the range of about 6 to about 7, and then effecting cyclization of said hydrazone in an aqueous alcoholic medium by adding a base thereto to bring the pH thereof within the range of 7 to about 9.8.

4. The method of preparing N-(benzylidene)-3-amino-2-oxazolidone, which comprises causing benzaldehyde 2-hydroxyethylhydrazone to react with ethyl chlorocarbonate to form N-(benzylidene)-N'-(carbethoxy)-N'-(2-hydroxyethyl) hydrazone in the presence of a buffering agent adapted to maintain a pH within the range of about 6 to about 7 and at a temperature of about 19–21° C., and then effecting cyclization of said hydrazone in an aqueous alcoholic medium by adding a base thereto to bring the pH thereof within the range of 7 to about 9.8 and holding the temperature of the reaction mixture at about 30° C.

5. The method of preparing N-(benzylidene)-3-amino-2-oxazolidone, which comprises causing benzaldehyde 2-hydroxyethylhydrazone to react with ethyl chlorocarbonate to form N-(benzylidene)-N'-(carbethoxy)-N'-(2-hydroxyethyl) hydrazone in the presence of a buffering agent adapted to maintain a pH within the range of about 6 to about 7 and at a temperature of about 19–21° C., and then effecting cyclization of said hydrazone in an aqueous alcoholic medium by adding a base thereto to bring the pH thereof to about 9.8 and holding the temperature of the reaction mixture at about 30° C.

6. The method of preparing N-(benzylidene)-3-amino-2-oxazolidone, which comprises reacting benzaldehyde with mono-2-hydroxyethyl hydrazine to form benzaldehyde 2-hydroxyethylhydrazone, then causing said benzaldehyde 2-hydroxyethylhydrazone to react with ethyl chlorocarbonate to form N-(benzylidene)-N'-(carbethoxy)-N'-(2-hydroxyethyl) hydrazone, and then effecting cyclization of said hydrazone in an aqueous alcoholic medium by adding a base thereto to bring the pH thereof within the range of 7 to about 9.8.

7. The method of preparing N-(benzylidene)-3-amino-2-oxazolidone, which comprises reacting benzaldehyde with mono-2-hydroxyethyl hydrazine to form benzaldehyde 2-hydroxyethylhydrazone, then causing said benzaldehyde 2-hydroxyethylhydrazone to react with ethyl chlorocarbonate using a molar ratio of about 1:1.3 to form N-(benzylidene)-N'-(carbethoxy)-N'-(2-hydroxyethyl) hydrazone in the presence of sufficient sodium acetate to maintain a pH within the range of about 6 to about 7 and at a temperature of about 19–21° C., and then effecting cyclization of said hydrazone in an aqueous alcoholic medium by adding a molar ratio of sodium hydroxide thereto of about $1.5 \times 10^{-2}:1$ and holding the temperature of the reaction mixture at about 30° C.

References Cited in the file of this patent

UNITED STATES PATENTS

| | | |
|---|---|---|
| 2,399,118 | Homeyer | Apr. 23, 1946 |
| 2,652,402 | Gever | Sept. 15, 1953 |